United States Patent [19]

Perlman

[11] Patent Number: 4,812,648
[45] Date of Patent: Mar. 14, 1989

[54] METHOD OF AND PASSIVE APPARATUS FOR DETECTING RADON

[75] Inventor: Daniel Perlman, Arlington, Mass.

[73] Assignee: Brandeis University, Waltham, Mass.

[21] Appl. No.: 32,745

[22] Filed: Mar. 31, 1987

[51] Int. Cl.[4] ................................................ G01V 5/00
[52] U.S. Cl. .................................. 250/255; 250/472.1; 250/253
[58] Field of Search ....................... 250/253, 255, 472.1

[56]  References Cited

U.S. PATENT DOCUMENTS

| | | | |
|---|---|---|---|
| 2,337,306 | 12/1943 | Barnes | 250/375 |
| 3,438,241 | 4/1969 | McKinley | 73/23 |
| 3,784,674 | 1/1974 | Stein | 423/249 |
| 3,940,471 | 2/1976 | Favre | 423/249 |
| 4,104,523 | 8/1978 | Wolfert | 250/370 A |
| 4,277,259 | 7/1981 | Rounbehler et al. | 55/270 |
| 4,327,575 | 5/1982 | Locker | 73/23 |
| 4,423,005 | 12/1983 | Murtaugh et al. | 422/61 |
| 4,700,070 | 10/1987 | Kovac | 250/304 |

OTHER PUBLICATIONS

Breslin et al., "An Improved-Time-Integr. Radon Mon.", NEA Specialist Meeting on Dosimetry . . . for Radon, Paris, Nov. 20-22, 1978.
B. L. Cohen & R. Nason, A Diffusion Barrier Charcoal Adsorption Collector for Measuring Rn Concentrations in Indoor Air, Aug. 1986, 457-463, *Health Physics*, vol. 50, No. 4.
H. M. Prichard & K. Marlen, Desorption of Radon from Activated Carbon Into a Liquid Scintillator, 1983, 155-157, *Analytical Chem.*, vol. 55.
A. C. George, Passive, Integrated Measurement of Indoor Radon Using Activated Carbon, Apr. 1984, 867-872, *Health Physics*, 46(4).
H. M. Prichard & K. Marien, a Passive Diffusion $^{222}$Rn Sampler Based on Activated Carbon Adsorption, Jun. 1985, 797-803, *Health Physics*, vol. 48, No. 6.

Primary Examiner—Carolyn E. Fields
Assistant Examiner—Richard Hanig
Attorney, Agent, or Firm—Hamilton, Brook, Smith & Reynolds

[57] ABSTRACT

A method of and apparatus for measuring radon concentration in air involving the provision of a detector containing a passive adsorbent of radon and a desiccant. The desiccant can selectively retain an amount of water weighing from about 25% to about 50% of the weight of the adsorbent. The detector is exposed to a finite air space to be measured for a predetermined time period. The radon is liberated from the passive adsorbent so that the alpha particles and beta particles, which are the signature of radon radioactivity, are counted by liquid scintillation technique.

11 Claims, 6 Drawing Sheets

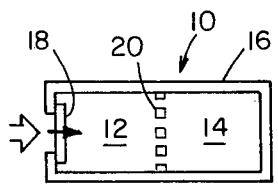
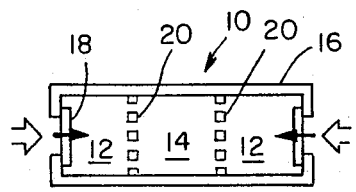
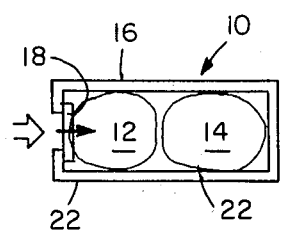
FIG. 2A   FIG. 2B   FIG. 2C
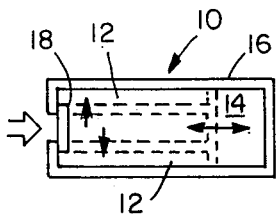
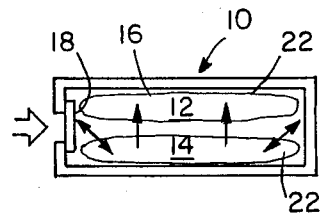
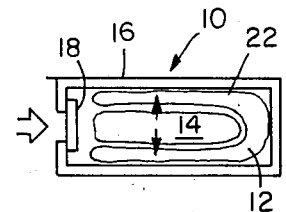
FIG. 3A   FIG. 3B   FIG. 3C
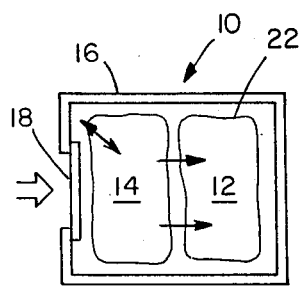
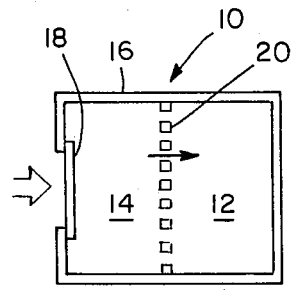
FIG. 4A   FIG. 4B
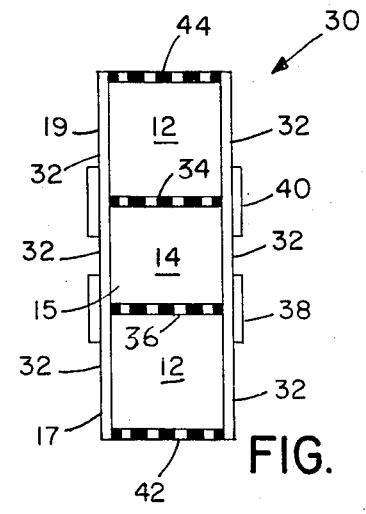
FIG. 5

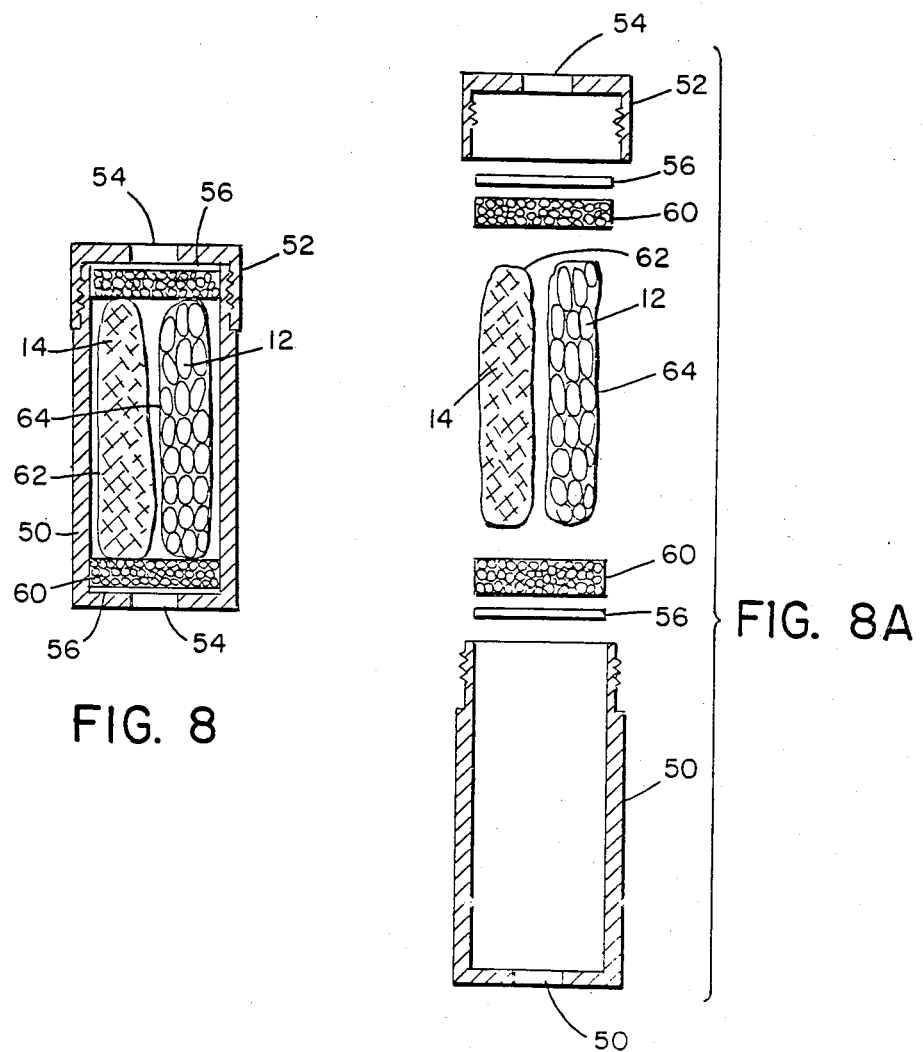

METHOD OF AND PASSIVE APPARATUS FOR DETECTING RADON

FIELD OF THE INVENTION

This invention relates to the detection and quantitative measurement of the radioactive isotope of radon, $^{222}$Rn, as encountered in air as in typical public and private buildings. It particularly relates to a passive detection system in which a radon adsorbent accumulates the radon by diffusion at the test site and the analysis is carried out by liquid scintillation techniques in a laboratory instrument.

BACKGROUND OF THE INVENTION $^{222}$Rn is a radioactive decay product of $^{238}$U which occurs naturally in the earth's crust and especially in granite rocks. $^{222}$Rn is often referred to simply as "radon" and that terminology will hereinafter be employed. That is, radon, as herein used, is defined to mean the specific isotope $^{222}$Rn which has a half-life of 3.82 days, decaying predominantly to the isotope $^{218}$Po with the emission of an alpha particle of 5.49 MeV of energy.

Radon is the heaviest of the inert gases, the end of the series beginning with helium and neon. When produced, it has the properties and the lifetime to diffuse out the minerals in which it forms and becomes a constituent of the air we breathe. Techniques for its collection and measurement date from its discovery in 1902. Private and public actions to understand and alleviate, ameliorate, or mitigate the problem require accurate measurements of the radon concentration in buildings. The effectiveness of charcoal to adsorb radon has been known since around 1910. However, only one paper: H. M. Prichard and K. D. Marien, "Desorption of radon from activated Carbon into a Liquid Scintillator," *Analytical Chemistry* 55, 155-157, 1983, describes the use of liquid scintillation counting techniques to measure the radon adsorbed in the charcoal. Liquid scintillation counting of radon makes use of the fact that the radon can be eluted from the charcoal into a solvent such as toluene or zylene since these chemicals have a far greater affinity for radon than does charcoal. A scintillation liquid such as Econofluor, available from Dupont DeNemours and Co., containing PPO-POPOP scintillants, for example, can be added to the elutant such as toluene so that each ionization event in the counting liquid results in a pulse of light which can be detected in a photomultiplier photon counter. The pulses can then be analyzed by techniques well known in the art.

Prichard and Marien recognize that moisture uptake by the charcoal can be a problem but do not consider ways to solve the problems of moisture on the measurements of the radon. Hereinafter, there will be described practical devices for effectively using the liquid scintillation technique for measuring radon concentration in activated charcoal exposed in domestic and commercial buildings. Particularly there will be described devices which reduce and eliminate the moisture uptake problems which seriously compromise the use of activated charcoal for radon adsorption.

The complex chain of radioactive decay events which follows the decay of radon explains why the liquid scintillation technique is inherently 2.5 times more effective than the almost universally used gamma ray techniques for measuring the radon in charcoal. Examination of the practicalities of gamma ray measurements of radon in charcoal shows that liquid scintillation counting of the alpha and beta particles has additional advantages which make liquid scintillation at least 25 and generally almost 100 times more effective than gamma ray measurements.

Radon, being inert, is not itself considered a health hazard. The harmful effects result mainly from the decay radiations from the progeny of the radon, all of which are chemically very active. There are five sequential decays which occur in the first few hours following the decay of $^{222}$Ra. The immediate daughter of $^{222}$Ra is $^{218}$Po which tranmutes in 3.05 minutes into $^{214}$Pb by emitting a 6.0 MeV alpha particle. $^{214}$Pb decays in turn with a half-life of 26.8 minutes, with the emission of an electron and a gamma ray, to an isotope of bismuth, $^{214}$Bi, which itself decays to $^{214}$Po in 19.8 minutes by emitting an electron and a gamma ray. Finally, $^{214}$Po decays in 164 microsecs by emitting a 7.687 MeV alpha particle. In summary, a sequence of short-lived transmutations takes place following each radon decay, and each step yields easily detectable radiation. In a matter of hours, three alpha particles, two electrons, and about two gamma rays are emitted for every radon decay. Thus, liquid scintillation (measuring both alpha and beta particles) can detect at least 2.5 times as many events as can gamma counters.

The dangers posed by the radiations emitted when radon decays have prompted the United States Environmental Protection Agency to issue guidelines for the levels of radon in air permissible under various circumstances. In domestic environments, an average yearly radon concentration exceeding 4 picoCuries per liter of air (4 pC/l) is considered cause for concern. A picoCurie is $3.7 \times 10^{-2}$ disintegrations per second, or $3.7 \times 10^{-2}$ Bq, where Bq is the symbol for a Bequeral, defined as one disintegration per second.

It is convenient to divide the methods and devices which have been developed for the detection of low levels of radon into passive and active. The passive methods, such as the invention to be described herein, make use of passive gas diffusion into any one of a variety of devices, so as to accumulate the radon or accumulate the effects of the radon emanations, for later measurement or analysis. Active methods have an active component at the test site. The component may be the gatherer device for the radon, it may be the electronic detector of the radon, it may, and generally does have both an active gatherer and an active detector. These methods are not relevant to this patent.

The passive methods and devices accumulate the radon, or effects resulting from the radon emanations, by passive diffusion of the ambient radon-bearing air into the accumulator. Measurements are made in a laboratory environment. For example, plastic track detectors accumulate track evidence for the number of alpha particles emitted in the decay of radon over a period of time. Plastic track detectors are still marketed but represent a fraction of the market. The overwhelming share of the passive radon detection market uses charcoal to accumulate the radon, and gamma ray detection techniques to measure the radon concentration.

The gamma rays emitted in the third and fourth links of the radon decay chain, i.e., from the decays of $^{214}$Pb and $^{214}$Bi, give a unique measure of the radon content. In this prior art method, a canister (or bag) containing 25 grams or more or charcoal is exposed to radon bearing air. The charcoal container is designed so that the accumulation takes place over a time comparable to the 3.8 day lifetime of radon. After exposure, the charcoal container is placed in front of a gamma ray counter, usually a NaI(Tl) detector, which records the integrated gamma ray emissions. The method has several advantages: First, large amounts of charcoal can be used, since the gamma rays can penetrate many centimeters of charcoal without being attenuated. Second, because the gamma rays can penetrate out of their thin walled container, the charcoal need not be disturbed to make the measurement, and the canisters can be recycled. Third, the counting techniques are simple and well-known in the art. There are, however, serious disadvantages to the technique. First, only two of the five links in the radon decay chain are detected so that significant radon signal is ignored. Second, the gamma ray detectors used for the commercial measurement of radon have rather low efficiently; ten percent efficiently is typical. Third, the gamma ray detectors have significant backgrounds unrelated to the radon signals; increasing the detector size to improve the efficiency of detection leads to even greater increases in background counts. Fourth, humidity problems can seriously compromise the accuracy of the measurements since moisture uptake displaces the radon accumulated in the charcoal. It is difficult to maintain the dryness of the large amounts of charcoal under humid conditions, and no marketed canister has solved this problem.

SUMMARY OF THE INVENTION

The invention resides in a method of measuring radon concentration in air in a particular area to be measured comprising providing a detector containing a passive adsorbent of radon and a desiccant whose weight is at least comparable to the weight of adsorbent. The detector is exposed to air to be measured for a predetermined time period. The radon is then liberated from the passive adsorbent so that the alpha particles and beta particles, which are the signature of radon radioactivity, are counted by liquid scintillation techniques.

The invention also resides in a passive diffusion device for measuring the intensity of radioactive radon concentrations in ambient air. The device has an adsorbent of radon in a container with one or more diffusion openings. The improvement comprises primarily juxtapositioning the adsorbent with a desiccant of a sufficient quantity to keep the adsorbent substantially moisture free for between one day and one week, during which time the device is exposed to radon under relative humidity conditions which may range from zero to 100%.

The juxtapositioned desiccant may be placed between the diffusion openings and the adsorbent so that the radioactive radon must pass through the desiccant on its way the the adsorbent. In another embodiment, the juxtapositioned desiccant is placed next to the adsorbent so that the radioactive radon entering the passive diffusion device is exposed to both desiccant and adsorbent simultaneously.

In another embodiment, the juxtapositioned desiccant is placed behind the adsorbent, so that the ambient air, which is laden with radioactive radon first enters the adsorbent and the weight of desiccant behind the adsorbent is sufficient to pull the moisture out of the adsorbent during the period of exposure to the ambient air.

The device may contain a substantially contamination-free granular radon absorbent in a premeasured amount, which can be transferred to and counted in a commercial liquid scintillation counter vial holding a maximum volume of about 25 ml.

The adsorbent in the device may comprise between from about 0.5 to about 5.0 g of activated charcoal.

The adsorbent is packaged separately from the desiccant and may be packaged in a rigid or flexible container, which container is gas and liquid permeable to permit both gas adsorption and liquid scintillant counting solution desorption of the radon from the adsorbent.

The container holding the desiccant and the adsorbent is preferably chemically unreactive with the chemical components in the liquid scintillator counting solution. The container may be translucent or transparent to the photons generated by the liquid scintillant solution so that the photons are counted by the liquid scintillator counter.

The desiccant may comprise either granular anhydrous silicon gel, anhydrous $CaSO_4$ or other granular moisture adsorbent which, while retaining water, is non-deliquescent.

The device may have air convection barriers in the diffusion openings, which comprise a substantially moisture-insensitive radon permeable membrane which may consist of paper, filter paper, hydrophobic filter paper or equivalents.

In its broader sense, the invention relates to a passive diffusion device which contains at least one opening through which a constituent of a gas mixture may pass. Because the gas mixture contains moisture, and moisture interferes with adsorption of the constituent in an adsorbent within the device, there is a need to reduce or eliminate the moisture uptake in the absorbent. The invention particularly relates to the use of a desiccant juxtapositioned with the adsorbent so that the moisture-laden gas is exposed to both the desiccant and the absorbent simultaneously and the desiccant is present in sufficient quantity to keep the adsorbent substantially moisture-free during the period of testing under relative humidity conditions which range from zero to 100%. In a more specific embodiment of the invention, the desiccant is placed behind the adsorbent relative to the air flow so that the moisture-laden gas or air is first exposed to the adsorbent, and the desiccant is present in a sufficient quantity to pull the moisture from the adsorbent to maintain the adsorbent substantially moisture-free during the period of testing under relative humidity conditions ranging from 0 to 100%.

The above, and other features of the invention, including various novel details of construction and combinations of parts will now be more particularly described with reference to the accompanying drawings and pointed out in the claims. It will be understood that the particular method of and passive apparatus for detecting radon, which embody the invention, are shown and described by way of illustration only, and not as a limitation of the invention. The principles and features of this invention may be employed in varied and numerous embodiments without departing from the scope of the invention.

BRIEF DESCRIPTION OF THE FIGURES

FIG. 2A through 4B are schematic representations of different functional geometries for positioning radon adsorbent and moisture desiccant in passive diffusion radon detectors.

FIG. 5 shows a preferred radon detection device embodying the invention.

FIG. 8 and 8A are sectional views assembled and in exploded form respectively of yet another embodiment of a passive diffusion device embodying the invention.

THE METHOD

Figure 1:
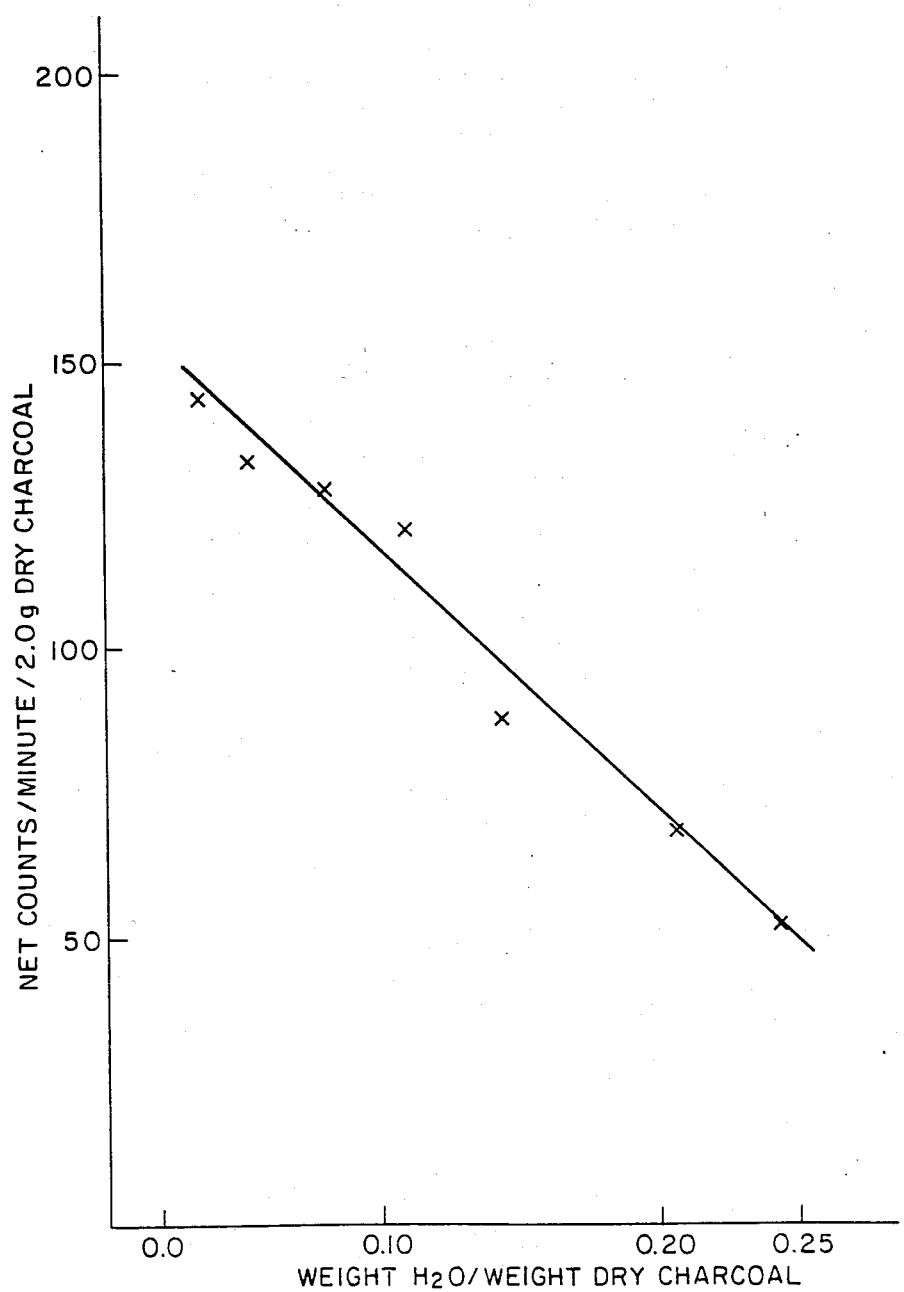
FIG. 1 is a graph showing the maximum amount of radon which can be adsorbed from air containing approximately 2.0 pCi/l radon, by two grams of dry activated charcoal plotted as a function of the weight percent of moisture uptake.

All of the disadvantages of gamma ray detection are offset if the radon in the charcoal is measured by liquid scintillation counter (LSC) techniques. The advantages of LSC techniques are gained at the cost of added complexity in handling the radon accumulators but, as will be shown, this is a small cost compared to the three primary advantages gained: First, the resulting detector is smaller in size by as much as a factor of ten. Second, the resulting detector has a least five times the sensitivity of the present gamma ray detection canisters. Third, the resulting detector can be made impervious to the severe problems of high humidity. Until now, the LSC method itself has only been a laboratory tool. That laboratory tool has been adapted for commercial purposes and in doing so new and surprising innovations have been made. The complete technique of LSC counting of radon in charcoal is described hereinafter often omitting the use of desiccants to eliminate moisture uptake. It is emphasized that the following technique, without the use of desiccants meets the United States Government's Environmental Protection Agency's Radon Proficiency tests.

Two grams of clean substantially dust-free activated charcoal can be obtained from commercial sources which package the charcoal for the food and drug industries. The charcoal is contained in a hollow plastic cylinder perforated on either end. This is an ideal arrangement for radon uptake, since the perforations act as diffusers and barriers against air currents. Data has shown that radon accumulates as a function of the time of exposure in radon-bearing air. Radon accumulates, reaching equilibrium in two days and the radon concentration in the charcoal then remains constant and independent of time thereafter. Of course, in a humid environment, the charcoal will continue to take up moisture, displacing the radon and reducing its concentration in the charcoal. The effect of the moisture can be taken into account to first approximation by noting the final weight of the charcoal, an extra step in the counting and data analysis process. The correction depends on the time variation of the ambient humidity and represents an approximation. This correction diminishes in accuracy the greater the weight percentage of moisture in the charcoal.

After a two to three day exposure time in radon-bearing air, the canister is brought to the laboratory, opened, and poured into a cocktail containing about 10 grams of xylene plus 5 grams of commercial liquid scintillant. The exact amounts are not critical. The radon partitions preferentially with xylene and after a few hours essentially all of the radon has been eluted into the liquid. The liquid is then decanted into a liquid scintillator vial for counting. Since the radon has already been decaying for a number of hours it is in equilibrium with its radioactive isotope decay daughters. As a result, there are three alpha particles and two beta particles emitted for each radon decay. That is, five signals are observed by the photomultiplier for each radon nucleus which decays in the counting vial. The energies of the alpha and beta particles are so great that each particle result in thousands of photons which are detected by the photomultipliers of the LSC. The counting efficiency is therefore close to 100%.

The liquid scintillation counter technique is well established in the biomedical areas of science and several companies make counting equipment which will process hundreds of samples automatically in continuous feed arrangements. These commercial instruments can only utilize relatively small amounts of charcoal; about 5 grams is maximum, 2 grams is about optimum. Thus a two gram canister, made commercially for the food and drug industry, has proved almost ideal for LSC. However, two grams is much smaller that can be utilized by gamma ray counting techniques. Since the amount of radon which can be adsorbed by the charcoal is proportional to the weight of the charcoal, the LSC method, to effectively compete with the gamma ray measuring techniques, must have offsetting advantages. In fact, LSC has improved performance in each of the four areas where the gamma ray detection technique is weak: First, the liquid scintillator detects all the charged particles which result from a radon decay. Thus, it detects 5 signals rather than 2. Second, the liquid scintillation technique has almost 100% efficiency for detection of these high energy charge particles; 95% efficiency is typical. Third, the background counts, typically about 25 counts per minute, are three or more times smaller for LSC than for gamma ray detection, primarily because the liquid scintillant has much small volume that the NaI(Tl) detector. These three advantages give the LSC technique a 50 to 100-fold advantage over the gamma ray detection technique so that liquid scintillation with a two gram adsorbent is a more effective detector for radon that is a 25 gram adsorbent using gamma ray detection. Finally, the small weight of adsorbent gives the method a further and decisive advantage since it makes practical the engineering of a radon accumulator which is essentially unaffected by humidity.

The reduction of moisture uptake by the adsorbent is a central part of this invention. The invention described herein is more general that its use for radon detection, in that it can be used to reduce or eliminate the moisture uptake from a gas into any adsorbent.

The effect of the moisture uptake on the radon concentration is shown in FIG. 1 based on laboratory measurements. In FIG. 1, the maximum radon which can be adsorbed by two grams of initially dry activated charcoal is plotted as a function of the weight percent of moisture uptake. The former is measured as the net counts per minute of radon radioactivity measured in the LSC; the latter is the weight of water uptake to the weight of dry charcoal. Water uptake by the charcoal monotonically decreases the radon count. When the charcoal has adsorbed 25% of its own weight, the radon concentration has decreased by more than a factor of three. These data show that there is a 2.8% decrease in maximum radon adsorption for each weight percent of moisture uptake. A 25% moisture uptake by charcoal can be achieved in a few days of exposure to high relative humidity unless special preventive measures are taken. The detectors now on the market do not take adequate preventive measures. As a consequence, the activated charcoal radon detectors that are now on the market may give values too low by factors as large as two or three if the detectors are placed in a humid environment. The present invention solves this problem in new and novel ways.

Passive diffusion/adsorption devices have been designed containing a radon adsorbent (typically 0.5–5.0 g activated charcoal) placed in various orientations relative to a quantity of desiccant. This desiccant quantity is sufficient to maintain the radon adsorbent in an essentially dry condition for a period of time of between 1 and 7 days of exposure to humid air. The amount of radon adsorbent is sufficiently large to adsorb an amount of airborne radon to permit detection of radon levels as low as 0.1 pCi per liter of air using liquid scintillation counting (LSC). The amount of adsorbent is also sufficiently small so as to be extractable into liquid scintillation solution and countable in commercially available LSC vials (holding a maximum of approximately 25 ml) placed in commercial LSC machines. The desiccant in the device (typically 2–25 g silica gel), eliminates moisture in the charcoal, thereby obviating moisture correction calculations in the counting data. Such calculations inevitably reduce the accuracy of the radon test.

The moisture partition between dry charcoal and silica gel desiccant placed in different locations relative to one another in the device and with the desiccant carrying different percentages by weight of water has been studied. Considering the location of the diffusion entrances in the device for ambient air, studies have shown that desiccants can be positioned in "parallel" with or even behind the charcoal, as well as in "series" with i.e. front of the charcoal. That is, a wide variety of geometries of adsorbent and desiccant can maintain the charcoal adsorbent in an essentially dry condition. The various geometries of desiccant positioning are possible because an appropriate amount of desiccant, maintained below a certain percentage content of water, will remove moisture from the charcoal adsorbent more rapidly than moisture can enter the device by diffusion to accumulate in the dry charcoal.

The ability to maintain charcoal in a dry condition without the limitation of placing the desiccant in front of the charcoal, i.e., between the charcoal and the diffusion entrance for ambient air, is significant for several reasons. First, is the practical one of allowing greater variations in the allowable geometries for desiccant-adsorbent, which can result in significant cost-savings in packaging. Second, the new discovery allows one flexibility to design geometries for special purposes such as determining the source of radon emanation. Third, the new discovery allows a far better control of the "time-constants", i.e., the equilibration time for practical detectors than would be possible with the normal prior-art "series" geometry in which the radon bearing air passes through the desiccant to the adsorbent. Regarding this last point, it has been found that a desiccant, even in coarse granular form, may significantly reduce the diffusion rate of radon into the charcoal if placed in "series" between the entrance and the adsorbent. In such a geometry, the diffusion rates is thus controlled by a variety of interrelated factors. It is desirable to control the radon diffusion rate, and thus the device's equilibration time for radon, by varying only the size of the diffusion entrance to the device. This control is readily achieved if the desiccant is positioned in parallel with or even behind the radon adsorbent. For common desiccants, such as silica gel and Drierite TM (anhydrous $CaSO_4$) the amount of desiccant should be between one and ten times as great as the weight of charcoal. This amount of desiccant is sufficient to maintain charcoal dryness for at least 4 days even at a relative humidity of 80% given, for example, diffusion openings of between 0.10 and 1.0 $cm^2$ per 2.0 g charcoal. For diffusion access and for subsequently maximizing LSC counting efficiency and convenience in sample processing, the charcoal may be packaged in a gas and liquid permeable container (e.g., a canister or bag) which can be placed directly in the LSC solution.

Currently available passive collectors for radon typically consist of between 25 and 50 grams (g) of activated charcoal packaged in a container with or without a diffusion limiting orifice to control the rate of radon uptake. This quantity of charcoal is appropriate for conventional gamma ray measurement of radon levels above 1 picoCurie (pCi) per liter. No current device has the capability of preventing ambient moisture uptake by the dry activated charcoal in conditions of high humidity over a several day period. Consequently, inaccuracies are generated in calculating ambient radon levels because radon adsorption-moisture correction factors are often large. These corrections introduce large uncertainties in the final calculations of radon level.

Much smaller amounts of charcoal may be used to constitute the radon adsorbent in such collectors if liquid scintillation counting (LSC) is utilized to measure the radon level rather than gamma counting. This reduction in scale is possible since one can obtain at least a 50-fold greater sensitivity per gram of charcoal in measuring radon and its radioactive daughter products by LSC rather than by gamma counting.

For example, using LSC detectors, at an ambient radon level of 1 pCi per liter, 55 cpm above a constant background of 25 cpm using a 2 g miniature charcoal detector is typically measured. Yet a conventional state-of-the-art detector containing 25 g charcoal designed for gamma ray counting of radon measured 13 cpm for air containing 1 pCi per liter radon above a background of 80 cpm in the 220–390 KeV energy spectral window (Cohen and Nason, 1986). At this radon level, the signal to background ratio of the liquid scintillation detector is more than a factor ten times the ratio obtained with the gamma detector.

The 1 to 5 g quantity of charcoal which has been designed into the radon detectors for LSC counting, permits additional critical design modifications which were hitherto either impractical or impossible. To understand these features it is necessary to consider the principals and mechanisms governing the functioning of the passive adsorption radon detector.

Activated charcoal granules are typically used as the material for adsorbing radioactive radon in passive diffusion collector devices designed to monitor airborne radon levels. The charcoal within such collector devices is intended to accumulate radon over time, from the surrounding air. After a certain period of time, a sufficient volume of air has entered the device to equilibrate the charcoal (via an adsorption-desorption equilibrium) with respect to the airborne radon. The time required to reach this steady state may be defined as the integration time constant (ITC) for the device. The diffusion rate of radon into the device, the weight of charcoal, its surface area as well as the geometry of the device determine the ITC for the device. If, for example a substantial amount of charcoal is located in a device with only a small opening, the ITC may be large. Conversely, a thin bed of charcoal placed in open cheese cloth suspended in radon-containing air would have a small ITC. An ITC of between 2 days and 1 week is often very desirable so that an integrated average radon level is measured despite diurnal and other natural fluctuations in ambient environmental radon concentration.

Passive diffusion charcoal collectors for radon have been in use for many years but their accuracy and sensitivity are compromised by the presence of water vapor in the air being monitored. Adsorption of water diminishes charcoal's capacity for adsorbing radon. Moisture correction curves can be applied to the radon accumulation data (radioactivity typically measured as counts per minute and converted to pCi per liter of air). However, these moisture correction methods suffer the limitation that the water content of the initially dry charcoal is increasing over the device's exposure period and may also be fluctuating. Thus, the water correction factor tends to be imprecise. It is common to measure a 20-25% increase in charcoal weight due to water vapor accumulation under moderate to high humidity conditions (about 75% relative humidity) over a two or three day period. This water content typically causes greater than a 50% reduction in radon adsorption capacity. Therefore, large uncertainties in the actual radon level are generated as a result of changing water content in charcoal.

There has been one published report on a passive charcoal collector for radon in which the authors attempted to solve the water adsorption problem in charcoal. A porous bag of dry silica gel was placed against the underside of the lid of the collector canister in the path of air entering through a round hole in this lid. The purpose of the silica gel was to dry the incoming air before reaching the charcoal in the bottom of the can. The authors failed in the attempt noting only about a 25% reduction in the amount of water reaching the charcoal, compared to a similar device lacking silica gel. It was noted that even when the radon canister was completely filled with loose desiccant, "the mass gain of the charcoal under high humidity conditions (was) reduced to half of that with the double nylon screen alone . . ." (Cohen and Nason, 1986). Given these unsatisfactory results the ability of silica gel and similar granular drying agents (e.g., Drierite ™-anhydrous $CaSO_4$) to keep charcoal granules completely dry during radon collection over a several day period was studied. Because dry silica gel and some other agents have a stronger affinity for water than does dry charcoal (up to a certain threshold water content in the drying agent), water previously adsorbed by charcoal can be removed by juxtaposition of the drying agent and the moist charcoal within one container. By placing a sufficient amount of the drying agent in a passive diffusion radon collector alongside the charcoal granules within the device, the charcoal may be maintained dry even in the presence of high humidity. The amount of drying agent required to keep the air dry within a diffusion collector depends upon the air diffusion rate, the water content of the moist air entering the collector, and the exposure time to the air. As it has been shown, the minimum amount of drying agent required under conditions of high humidity is an amount equal to and preferable twice the amount of charcoal adsorbent. The weight and size of a passive detector are important considerations from a marketing point of view. The conventional passive radon collectors which typically contain 25 g of charcoal would have to have 50 to 75 g of desiccant to maintain dryness. The added weight would add several dollars to the first class mailing costs and would seriously compromise the competitiveness of the product. From a marketing point of view, it is therefore essential to reduce the size of conventional passive radon collectors by reducing the amount of adsorption charcoal by factors of at least ten. This has been done by making use of the advantages of the LSC counting techniques. By appropriate choice of the size of the diffusion orifices into the devices, all incoming moisture was sequestered in air for test periods extending to at least one week using only these modest amounts of drying agents. Since 2 to 4 days is typically sufficient for integrating over diurnal and meteorological fluctuations in radon levels, drying capacity is more than adequate. From another perspective, by reducing the size (i.e., area) of the diffusion orifice, and thus reducing the amount of incoming radon-bearing air, a smaller amount of charcoal is appropriate to effectively equilibrate with the air (one gram of charcoal retains the radon content of approximately four liters of air). This has been compensated, in turn, for the proportionately smaller amount of radioactive radon captured by the smaller amount of charcoal by employing a very sensitive radioactive counting method. The method known as liquid scintillation counting (LSC) is described in the prior art but has not yet been employed in combination with a miniaturized or a humidity-independent radon collector.

Determining the Amount of Drying Agent (e.g., silica gel) Required to Remove Moisture from Radon-bearing Air It has been empirically determined that each gram of dry activated charcoal in a passive diffusion radon collector can retain the radon content from approximately 4 liters of air. Nevertheless much more than 4 liters of air per gram charcoal has been found to enter such collectors in the course of typical radon test periods. The amount of drying agent such as silica gel, required to keep charcoal dry in radon collectors which have been designed is estimated as follows: It has been previously reported that silica gel acting as a drying agent will adsorb water equal to 30-33% of its dry weight. It has been experimentally determined that silica gel placed next to dry charcoal in a closed container retains 100% of the moisture, provided that the amount of water contained in the silica gel is less than or equal to 20% of its original dry weight. Above approximately 25% added water weight, however, the silica gel gives up almost all additional water to dry juxtaposed charcoal. Therefore, it is desirable to include sufficient silica gel in a radon collector so as not to exceed the 20% water figure mentioned above. A number of radon collectors have been designed which have integration time constants of between one and four days and are therefore exposed to ambient atmospheric conditions for at least those lengths of time. It has been determined that at 23° C. under conditions of maximum relative humidity (approaching 100%) the originally dry charcoal in these collectors may accumulate up to 25% added weight of water in a 24 hour period if silica gel is absent.

The weight of dry silica gel required to adsorb this water and still remain below 20% added water weight is approximately 1.25 times the weight of the charcoal in the collector. For four days of radon collection it may therefore be necessary to have 4×1.25 or 5 times as much dry silica gel as dry charcoal in a passive radon collector. In miniaturized passive radon collectors containing typically 1 to 5 g dry charcoal the amount of silica gel therefore ranges from 5 to 25 g but maybe as little as 2 g if either the humidity is lower or the exposure time is shorter than the maximum figures cited above.

In prior art devices designed to measure radon levels by charcoal adsorption, moisture accumulation has been problematic. As described previously (A. S George, Health Physics 46, 867–872, 1984), correction curves may be applied to the radon levels measured, but these corrections introduce considerable uncertainties in the final calculated levels. Cohen and Nason (Health Physics 50, 457–463, 1986) attempted to block moisture entry into a 25 g passive charcoal collector using a 3 g bag of "sorbit" silica gel mounted under a ⅜ inch diameter opening to the air. The scale of their device, both in terms of weight of charcoal and diffusion orifice is approximately 10-fold larger than devices made in accordance with this invention and would require approximately 125 g silica gel to maintain charcoal dryness for approximately a 4 day exposure at moderate to high humidity. The Cohen and Nason device even when entirely filled with silica gel positioned between the diffusion opening and the charcoal layer still accumulated an amount of water in the charcoal equal to half the amount obtained without any drying agent (above reference, pp. 461–462).

Location of the Drying Agent

Both in the Cohen and Nason (1986) radon collector and in an adsorbent measuring device for chemical substances described in the patent literature (Locker, U.S. Pat. No. 4,327,575), drying agents and other pre-adsorbents have been inserted in the path of incoming air to eliminate an undesirable or interfering gas or other substance prior to the air entering the primary adsorbent (e.g., charcoal).

It was predicted that significant benefits could be obtained if the drying agent were placed alongside of, or behind, the charcoal rather than in the path of incoming air diffusing toward the charcoal (the primary adsorbent). That is, if a desiccant removed the moisture from incoming air at the same time or even after the air came in contact with the charcoal, the radon diffusion rate of the passive collector could be adjusted and optimized independently of the desiccant present. It was discovered that water can indeed be removed by desiccant positioned as described above. It was determined that charcoal can even be kept dry by desiccant placed beyond the charcoal relative to the diffusion opening (after the air has contacted the charcoal). In the case of silica gel, the amount of desiccant should be sufficient so that its moisture content does not exceed approximately 20% of its dry weight.

Radon-containing charcoal has been counted by LSC, with improved sensitivity, reproducibility and convenience by introducing additional design features into the radon collectors. These features include packaging the charcoal in a gas and liquid permeable translucent or transparent container which can be directly immersed in LSC organic counting solvent. These containers liberate radon into the counting solvent without harmfully reacting with the solvent. Examples of appropriate materials for such charcoal containers include the polyolefins (including holes or pores for permeability) as well as paper, fiber and membrane materials which become clear or translucent in LSC solvent. The design features also include utilizing a substantially dust-free washed granular charcoal to maximize the fluorescence light output from the LSC vials. It is impossible however, to completely eliminate charcoal dust from granular charcoal due to a certain level of abrasion between loose particles. It was discovered that by maintaining the charcoal essentially dry during radon exposure (using the desiccant design features), whatever charcoal dust is still present in the LSC solvent, settles to the bottom of the counting vial together with the coarse granules. Conversely however, if the charcoal is not maintained essentially dry, the same charcoal dust adheres to the walls of the LSC counting vial, reducing light output and thereby decreasing the reproducibility and sensitivity of the LSC test. Therefore, careful desiccant design not only results in increased radon capacity for a given amount of activated charcoal but also improves the subsequent accuracy of the test using LSC counting.

Type of Drying Agent

Several granular desiccant materials have been successfully used to exclude moisture from radon adsorbent materials. In the presence of charcoal adsorbent, both granular silica gel desiccant (approximately 1 to 2 mm grain diameter) and anhydrous $CaSO_4$ or Drierite TM (approximately 2 to 4 mm grain size) have proven effective at removing and/or excluding moisture. These desiccants have been effective both in free granular form as well as in porous packaged form, juxtaposed to charcoal placed within a porous container. The desiccant material is preferably chosen from the group as moisture adsorbents which do not deliquesce, i.e., become wet in the presence of moisture. Such deliquescence can result in contamination of the charcoal by partially dissolved desiccant. This contamination could, in turn, cause fluorescence quenching and thus data abnormalities during LSC sample analysis.

Air Convection Barrier

It has previously been shown that a double layer of fine nylon mesh placed over the diffusion opening of a passive radon detector device serves to reduce undesirable entry of air into such a device via convection (Cohen and Nason, 1986). It was demonstrated that a less expensive and equally effective paper barrier can replace the nylon mesh. For example, it was shown that there is no significant difference in radon diffusion rate into such devices, comparing Whatman No. 1 filter paper and nylon mesh placed over the opening. It was additionally found that under conditions of high relative humidity, a hydrophobic filter paper barrier (displaying little to no moisture affinity) is superior to ordinary filter paper (hydrophilic) in minimizing moisture uptake by the device. Thus high porosity siliconized phase separation filter paper (typically used in separating aqueous and nonaqueous liquid phases) is ideal. Such filter paper is commonly available from Whatman (1PS paper) and Schleicher and Schuell (595hy paper).

The resulting passive diffusion detector which embodies the above considerations may take a variety of forms. Each form however, need only contain a small amount of charcoal (2 g is appropriate for LSC analysis of charcoal) and a relatively small amount of desiccant (5 to 10 g of silica gel will maintain the charcoal moisture-free in a high humidity environment over many days). The resulting detector is less than one quarter the size and weight of competitive passive detectors.

Specific Constructions of the Device

FIGS. 2A through 4B, show a variety of different functional geometries for positioning radon adsorbent and moisture desiccant in passive diffusion radon detectors. In the drawings the open arrows represents air carrying radon and moisture into the detectors. The closed arrows represent the direction of moisture movement within the detectors. In the devices 10 of FIGS. 2A, 2B and 2C desiccant 12 is placed in "series" relative to the direction of entry of radon and moisture into the detectors upstream from the radon adsorbent 14 in containers 16. In devices 3A, 3B and 3C desiccant 12 is placed in "parallel", i.e., along side the radon adsorbent 14, relative to the direction of entry of gasses into the detectors. In devices 4A and 4B desiccant 12 is placed "downstream" from, i.e., behind, the radon adsorbent 14 relative to the direction of entry of gasses into the detectors. For convenience in analyzing radon in the charcoal adsorbent 14 without the interference of desiccant 12 (using the LSC method) the desiccant 12 is packaged separately and is separated from the adsorbent 14 by either rigid or flexible radon-permeable containing means. A porous membrane, mesh, filter paper 18 or equivalent radon-permeable air convection barrier is positioned at the air entry orifices of the detectors. The outer container 16 of the detectors is radon and moisture-impermeable. Mesh 20 may separate the desiccant 12 from the adsorbent 14 as in FIGS. 1A and 1B or the desiccant and adsorbent may be placed in permeable bags 22.

A preferred embodiment of a passive diffusion radon detector with desiccant 12 on two sides or a radon adsorbent canister is shown in FIG. 5. This triple canister device which is similar to that shown in FIGS. 2B is a plastic cylinder 30 containing approximately 2 g activated charcoal 14 in a central container 15 with gas impermeable side walls 32 yet which is permeable at both ends 34 and 36 to allow entry of radon. Approximately 2 to 3 g desiccant 12 such as anhydrous silica gel is packaged in each of two outer desiccant containers 17 and 19 which are similar to container 15 and connected to container 15 by gas-impermeable ring adapters 34 and 40 forming radon and moisture-impermeable seals between the cylindrical elements of the device 30. The porosity of the permeable ends 42 and 44 in the desiccant cylinders may be varied to control the rate of entry of airborne radon (and moisture) into the device. Nylon meshes and polyethylene grids having different percentages of open space have been used to vary these rates which in turn influence the integration time constants of the devices.

Figure 6:
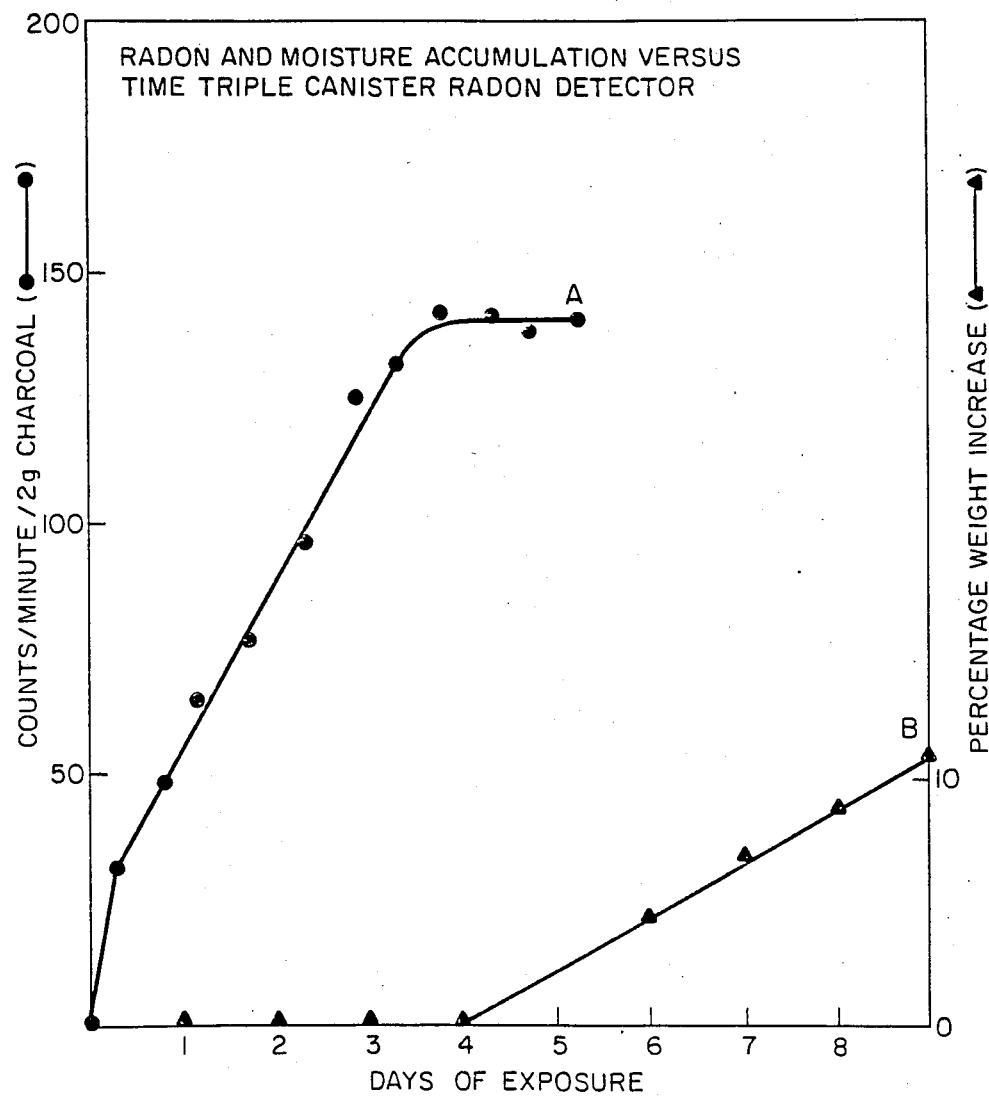
FIG. 6 is a graph showing radon and moisture accumulation in a triple canister radon detector plotted against days of exposure to ambient air.

A number of identical devices 30 shown in FIG. 5 carrying 2.0 g granular charcoal in a central canister and 2.5 g granular silica gel in each of the outside canisters were exposed to airborne radon at a concentration of 2.6 pCi/liter. The canisters 30 were positioned vertically during exposure to radon with both ends 42 and 44 having open access to the ambient atmosphere. Following exposure to radon, the charcoal from each canister was counted by LSC and the data plotted as seen in FIG. 6 as a function of exposure time (A). A plateau in the level of adsorbed radon was reached in 3.5–4.0 days. Subsequently, other identical devices were exposed to a high level of humidity (80% relative humidity, 23° C.). The canisters were positioned vertically as described above. The percentage weight gain by the charcoal due to moisture penetration of desiccant (termed moisture "break-through") was monitored as a function of time. Break-through did not occur until after 4 days of exposure, proving that radon equilibration (requiring 3-4 days) takes place before any substantial moisture uptake by the charcoal can occur (at relative humidities up to 80%). Moisture break-through commenced when the weight percentage of water gained by the dry silica gel exceeded 20–25%.

Figures 7, 7A:
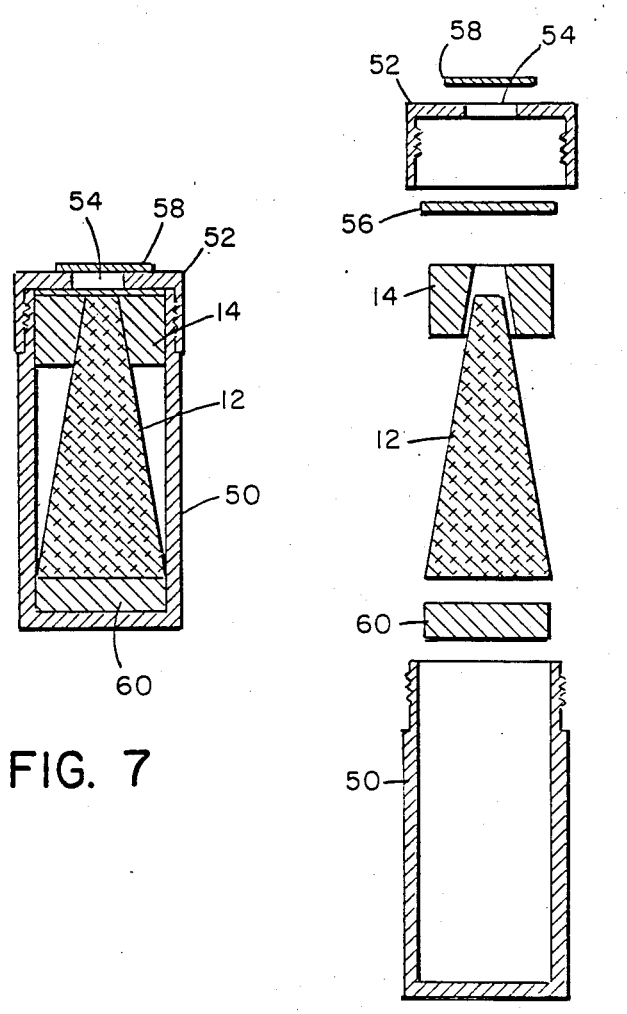
FIG. 7 and 7A are sectional views in assembled and in exploded form respectively of another embodiment of a passive diffusion radon detector.

Another preferred embodiment of a passive diffusion radon detector is shown in FIGS. 7 and 7A. Desiccant 12 is placed in the same chamber as the radon adsorbent 14. This device which is similar in principle to those shown in FIGS. 3B and 3C maintains approximately 2 g activated charcoal 14 in an essentially dry state without requiring the ambient atmosphere to first pass through desiccant 12. In fact the incoming air contacts the charcoal and desiccant simultaneously, i.e., in "parallel". The desiccant is effective in removing moisture from the charcoal [less than 0.5%-1.0% weight gain due to moisture retained by the charcoal over a 4 day period at 60-70% relative humidity]. The 2.0 g charcoal 14 and approximately 10 g silica gel desiccant 12 are packaged in commercially available flexible fiber bags. After wrapping the smaller charcoal bag 14 around the silica gel bag 12, the combination is placed in a polyethylene air-tight LSC vial 50 having screw-cap 52 (Poly Q LSC vial, Beckman, Inc.). However the screw-cap 52 has been modified by punching a 1 cm diameter hole 54 in the center of the cap and placing a 21 mm diameter filter paper disc 56 (hydrophobic paper #595 hy, Schleicher and Schuell, Inc.) under the cap 52. This filter disc serves as a gas permeable anti-air convection barrier. A moisture and radon-impermeable tape tab 58 is placed over the hole in the cap to seal the device and prevent the ambient atmosphere from entering the device before exposure to radon is desired.

A short length of ⅜" diameter gum-rubber tubing or a foam rubber disc 60 is placed at the bottom on the vial beneath the desiccant to "spring-load" the contents of the vial. This feature pushes the vial's contents upward against the filter paper disc 56 and screw-cap 52 thereby seating the filter-paper disc and assuring reproducible diffusion geometry for the charcoal.

Figure 9:
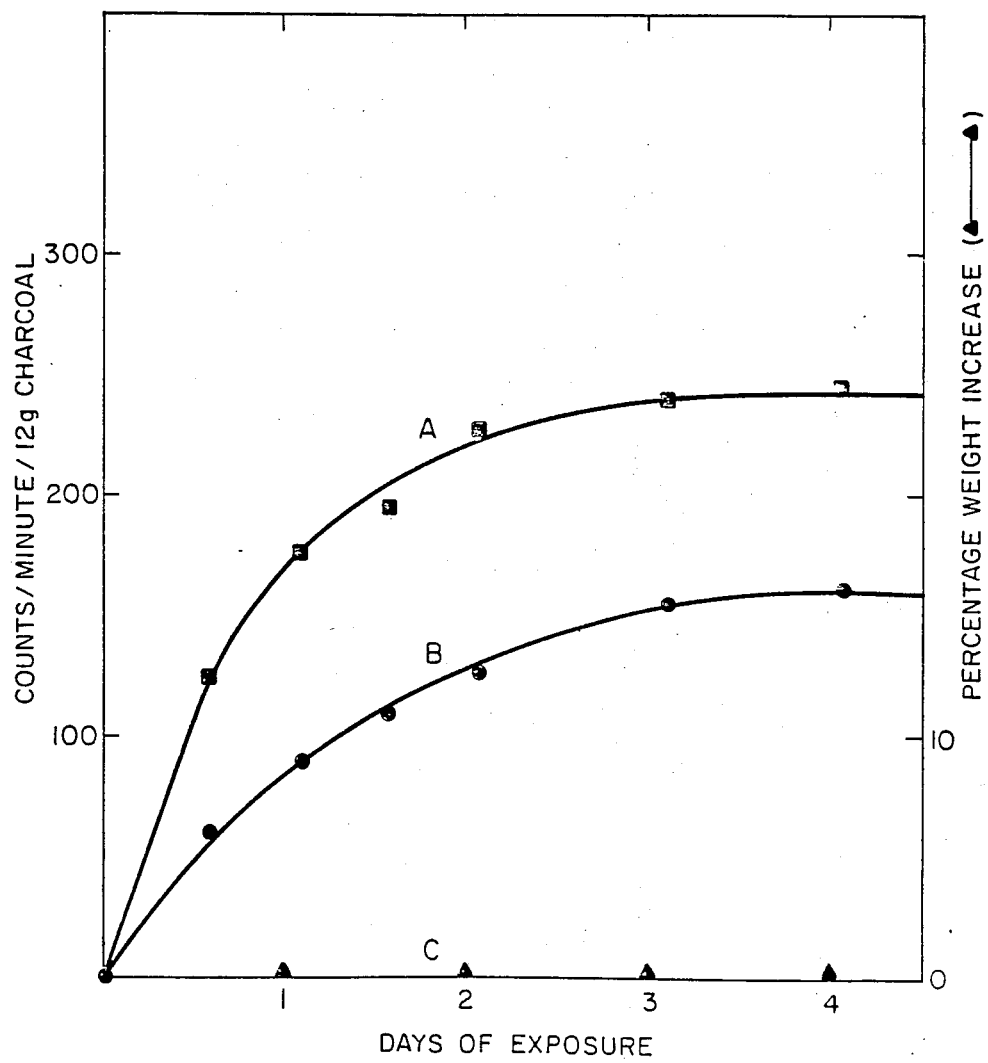
FIG. 9 is a graph showing equilibrium radon and moisture uptake curves for the passive diffusion device described in FIG. 8 and 8A.

Another embodiment of a passive diffusion device for detecting radon is shown in FIGS. 8 and 8A. It contains juxtaposed gas-permeable bags of adsorbent and desiccant. This device, similar to that diagrammed in FIG. 3B but having diffusion openings at both ends of the container, has been tested satisfactorily. The outer container vial 50 is the same as that used in FIG. 7. Centered round holes 54 placed at both ends of the container, i.e., one in the container 50 and one in the cap 52, allow for entry of radon which passes through air convection barriers 56 as described with respect to FIG. 7. Air and radon-permeable polyurethane cushions 60 assure that these barriers 56 are well seated, both inside the cap 52 and at the bottom of the container vial 50. Two porous fiber bags, 62 and 64, containing approximately 2.0 g granular activated charcoal 14 and the other containing between 2 and 5 g silica gel 12 have been juxtaposed within the container between the porous cushions 60 as seen in FIG. 8. FIG. 9 discloses radon equilibration and moisture uptake curves for passive diffusion device described in FIG. 8. Devices described in FIG. 8 containing 2.0 g granular activated charcoal 12 and 3.0 g anhydrous silica gel 14 were exposed to airborne radon for increasing lengths of time. These devices had either 9.0 mm or 5.0 mm diameter holes. The curves of each being designated A and B respectively in FIG. 9. A slower equilibration rate (longer integration time constant) and significantly lower radon plateau level is apparent for device with the smaller hole (B) compared to the device with the larger hole (A). The charcoal in both devices showed no measurable moisture uptake in the course of four day exposures to the ambient atmosphere at a relative humidity of 60-70% at 23° C. as seen in curve (C).

I claim:

1. In a passive diffusion device for measuring the radioactive radon concentration in ambient air having an adsorbent of radon in a container with one or more diffusion openings, the improvement comprising:
   juxtapositioning the adsorbent with a desiccant,
   the desiccant being present in a sufficient quantity to keep the adsorbent substantially moisture-free for between 1 day and 1 week during exposure to radon under relative humidity conditions ranging from 0 to 100%,
   the juxtaposed desiccant being placed in close proximity with the adsorbent so that the ambient air, carrying radioactive radon, can enter the adsorbent and the weight of desiccant is sufficient to remove moisture out of the adsorbent during the period of exposure of the device to the ambient air.

2. The device of claim 1 in which the juxtaposed desiccant is placed next to the adsorbent so that the radioactive radon entering the passive diffusion device is exposed to both desiccant and adsorbent simultaneously.

3. The device of claim 1 containing a substantially contamination-free granular radon adsorbent in a premeasured amount which can be counted with addition of LSC solution in a commercial liquid scintillation counter.

4. The device of claim 1 wherein the adsorbent comprises of between 0.5 and 5.0 g of activated charcoal.

5. The device of claim 1 wherein the adsorbent is packaged in a rigid or flexible container, and said container being permeable to permit both radon adsorption and subsequently desorption of the radon into LSC solution.

6. The device of claim 1 wherein the container holding the desiccant and the adsorbent is chemically unreactive with the chemical components in a liquid scintillator counting solution.

7. The device of claim 1 wherein the container holding the desiccant and the adsorbent is translucent or transparent to the photons generated by added liquid scintillant solution, so that said photons may be counted by a liquid scintillator counter.

8. The device of claim 1 wherein the desiccant consists of either granular anhydrous silica gel, anhydrous $CaSO_4$, or other granular moisture adsorbent which, while retaining water, is nondeliquescent.

9. The device of claim 1 having an air convection barrier in the diffusion openings comprising a substantially moisture-insensitive radon permeable membrane.

10. The device of claim 1 having a paper, filter paper, nylon mesh, polyethylene grid, hydrophobic filter paper or equivalent radon-permeable membrane over said one or more diffusion openings.

11. In a passive diffusion device containing one or more openings for measuring the radioactive radon concentration in ambient air containing moisture, by adsorption of said radon in an adsorbent within said device, wherein there is a new to reduce or eliminate said moisture uptake in said adsorbent, the improvement comprising a desiccant placed in close proximity with said adsorbent so that when the moisture-laden gas is exposed to said adsorbent and said desiccant is present in a sufficient quantity to remove said moisture from said adsorbent, said adsorbent is maintained substantially moisture free during the period of testing under relative humidity conditions ranging from 0 to 100%.

* * * * *